United States Patent
Brunet et al.

(10) Patent No.: US 9,244,570 B2
(45) Date of Patent: Jan. 26, 2016

(54) SYSTEM AND METHOD FOR REDUCING THE EFFECTS OF PARASITIC CAPACITANCES

(75) Inventors: Samuel Brunet, Cowes (GB); Luben Hristov Hristov, Sofia (BG)

(73) Assignee: Atmel Corporation, San Jose, CA (US)

( * ) Notice: Subject to any disclaimer, the term of this patent is extended or adjusted under 35 U.S.C. 154(b) by 916 days.

(21) Appl. No.: 13/351,597

(22) Filed: Jan. 17, 2012

(65) Prior Publication Data
US 2013/0181934 A1     Jul. 18, 2013

(51) Int. Cl.
G06F 3/044     (2006.01)
G06F 3/041     (2006.01)

(52) U.S. Cl.
CPC .............. *G06F 3/044* (2013.01); *G06F 3/0416* (2013.01)

(58) Field of Classification Search
CPC ....................................................... G06F 3/044
USPC ......................................................... 345/173
See application file for complete search history.

(56) References Cited

U.S. PATENT DOCUMENTS

| | | | |
|---|---|---|---|
| 5,170,129 A * | 12/1992 | Nobue et al. | 324/678 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2007/0261895 A1* | 11/2007 | Knowles et al. | 178/18.04 |
| 2009/0315854 A1 | 12/2009 | Matsuo | |
| 2010/0002349 A1* | 1/2010 | La Scala et al. | 361/90 |
| 2010/0073323 A1* | 3/2010 | Geaghan | 345/174 |
| 2010/0073324 A1* | 3/2010 | Yang et al. | 345/174 |
| 2010/0073325 A1* | 3/2010 | Yang | 345/174 |
| 2010/0097077 A1* | 4/2010 | Philipp et al. | 324/678 |
| 2010/0139991 A1* | 6/2010 | Philipp et al. | 178/18.06 |
| 2010/0164898 A1* | 7/2010 | Vu et al. | 345/173 |
| 2011/0001492 A1* | 1/2011 | Nys et al. | 324/658 |
| 2012/0242588 A1 | 9/2012 | Myers | |
| 2012/0242592 A1 | 9/2012 | Rothkopf | |

(Continued)

FOREIGN PATENT DOCUMENTS

WO     WO 2012/129247     9/2012

OTHER PUBLICATIONS

U.S. Appl. No. 61/454,936, filed Mar. 21, 2011, Myers.

(Continued)

*Primary Examiner* — Quan-Zhen Wang
*Assistant Examiner* — David Lee
(74) *Attorney, Agent, or Firm* — Baker Botts L.L.P.

(57) ABSTRACT

In one embodiment, a method includes discharging a first capacitor and discharging a set of capacitances present on a first set of lines of a touch sensor. After discharging the first capacitor and the set of capacitances, the method further includes causing charge to be transferred to the set of capacitances during a first time period. After the first time period, the method includes causing charge to be transferred to the first capacitor and the set of capacitances during a second time period. After the second time period, the voltage across the first capacitor to a first threshold is compared. The method also includes determining whether a touch was detected by the touch sensor based on comparing the voltage across the first capacitor to the first threshold.

21 Claims, 3 Drawing Sheets

(56) References Cited

U.S. PATENT DOCUMENTS

2012/0243151 A1   9/2012   Lynch
2012/0243719 A1   9/2012   Franklin

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

SYSTEM AND METHOD FOR REDUCING THE EFFECTS OF PARASITIC CAPACITANCES

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

Touch screens suffer from multiple issues. Components of touch screens such as touch sensors, circuit boards, and controllers may include parasitic capacitances that affect the accuracy of touch detection. Such parasitic capacitances may also prevent the ability to detect the proximity of an object to a touch sensor in some situations.

BRIEF DESCRIPTION OF THE DRAWINGS

Reference is now made to the following description taken in conjunction with the accompanying drawings, wherein like reference numbers represent like parts and which.

DESCRIPTION OF EXAMPLE EMBODIMENTS

Figure 1:
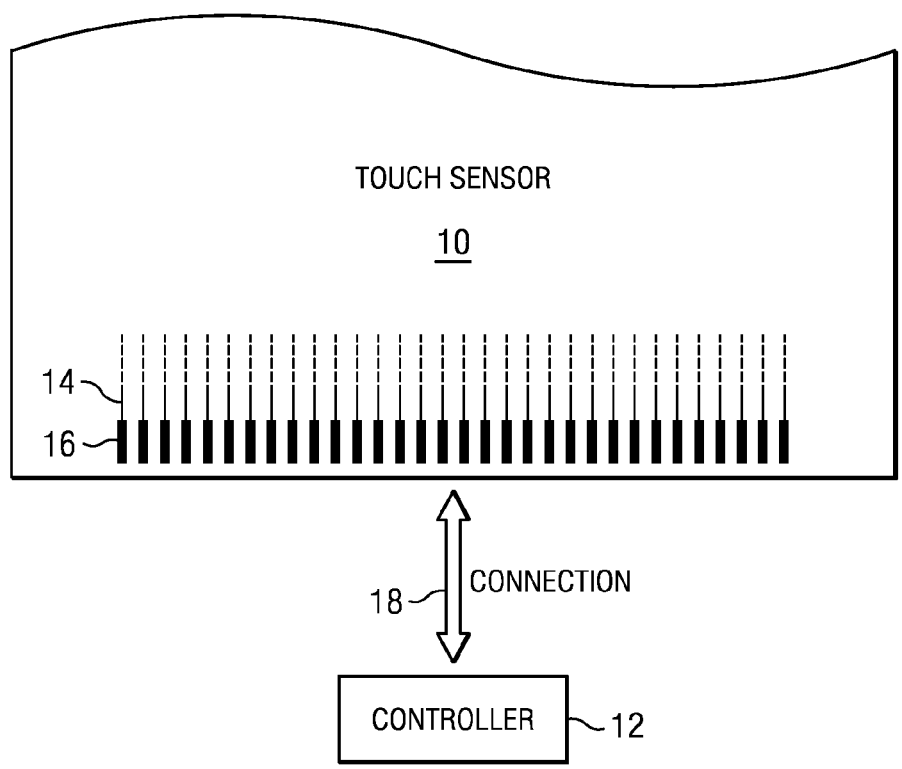
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on. Touch-sensor controller 12 may be configured to use precharging of capacitances present in touch sensor 10 and/or touch-sensor controller 12 to enhance touch detection (or proximity detection) as discussed further below with respect to FIGS. 2-4.

An electrode (whether a ground electrode, a guard electrode, a drive electrode, or a sense electrode) may be an area of conductive material forming a shape, such as for example a disc, square, rectangle, thin line, other suitable shape, or any suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in the mutual capacitance between each drive electrode and each sense electrode throughout the array, touch-sensor controller 12 may determine the position of the touch or proximity within the touch-sensitive area(s) of touch sensor 10. As discussed further below with respect to FIGS. 2-4, precharging of parasitic capacitances inherent in touch sensor 10 and/or touch-sensor controller 12 may be used to more accurately detect changes in capacitance throughout the array.

In a self-capacitance implementation, touch sensor 10 may include an array of electrodes of a single type that may each form a capacitive node. When an object touches or comes within proximity of the capacitive node, a change in self-capacitance may occur at the capacitive node (i.e., the change in capacitance between the capacitive node and ground) and touch-sensor controller 12 may measure the change in capacitance, for example, as a change in the amount of charge needed to raise the voltage at the capacitive node by a predetermined amount. As with a mutual-capacitance implementation, by measuring changes in capacitance throughout the array, touch-sensor controller 12 may determine the position of the touch or proximity within the touch-sensitive area (s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
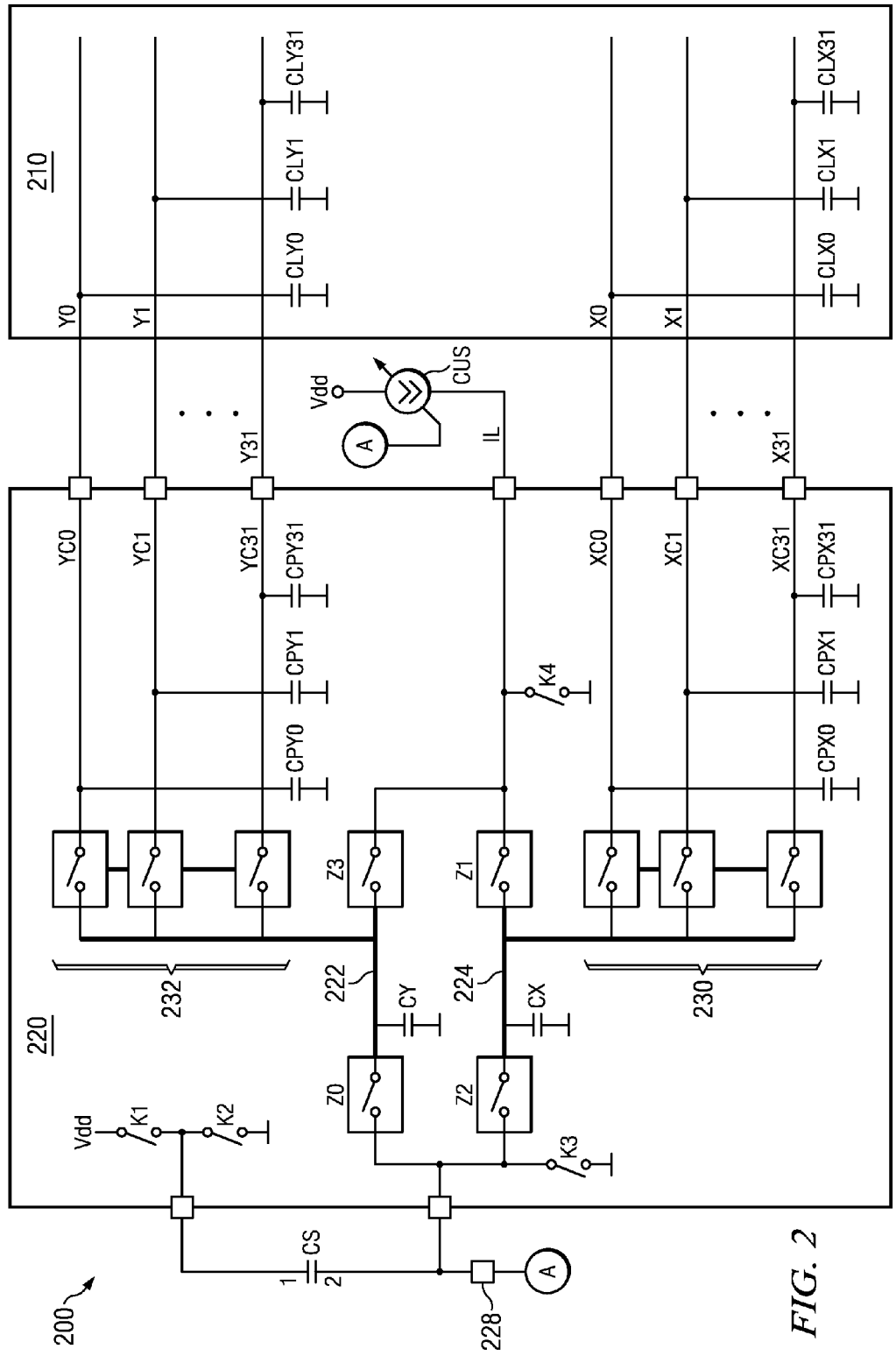
FIG. 2 illustrates one embodiment of a system configured to detect touches on, or whether an object is in proximity to, the system by precharging certain capacitances present in the system.

FIG. 2 illustrates one embodiment of system 200 configured to detect touches on, or whether an object is in proximity to, system 200 by precharging certain capacitances present in system 200. System 200 includes touch sensor 210 and controller 220. Touch sensor 210 includes lines X0-X31 that are coupled to lines XC0-XC31 included in controller 220 as well as lines Y0-Y31 that are coupled to lines YC0-YC31 included in controller 220. One or more of lines X0-X31 may have capacitances that are represented schematically in FIG. 2 as capacitors CLX0-CLX31, respectively. Capacitors CLX0-CLX31 may each represent one or more capacitances that may be present on lines X0-X31. The capacitances present on each of lines X0-X31 may include parasitic capacitances as well as capacitances of electrodes included in lines X0-X31. For example, capacitor CLX0 may represent the capacitances present on line X0. Similar to capacitors CLX0-CLX31, capacitances present on lines Y0-Y31 are represented schematically in FIG. 2 as capacitors CLY0-CLY31. The capacitances present on each of lines Y0-Y31 may include parasitic capacitances as well as capacitances of electrodes included in lines Y0-Y31. For example, capacitor CLY0 may represent the capacitances present on line Y0.

One or more of conductors XC0-XC31 may have parasitic capacitances represented schematically in FIG. 2 as capacitors CPX0-CPX31, respectively. One or more of conductors YC0-YC31 may have parasitic capacitances represented schematically in FIG. 2 as capacitors CPY0-CPY31, respectively. Each of lines XC0-XC31 may be coupled to sampling capacitor CS using switches of switch bank 230. Each of lines YC0-YC31 may be coupled to sampling capacitor CS using switches of switch bank 232.

Capacitor CS has two terminals: terminal 1 and terminal 2. In some embodiments, terminal 1 of capacitor CS may be coupled to voltage source Vdd via switch K1. Terminal 1 may be coupled to ground via switch K2. Terminal 2 of capacitor CS may be selectively coupled to conductors XC0-XC31 using network 224. Terminal 2 of capacitor CS may be selectively coupled to conductors YC0-YC31 using network 222. Networks 222 and networks 224 may be a network of analog components such as switches and/or multiplexers. Network 222 may have parasitic capacitances represented schematically in FIG. 2 as capacitor CY. Network 224 may have parasitic capacitances represented schematically in FIG. 2 as capacitor CX. Terminal 2 of capacitor CS may be coupled to capacitor CX via switch Z2. Switch K3 may couple each of capacitors CS, CX, and CY to ground. Voltage-controlled current source CUS is coupled to capacitor CX via switch Z1. Current source CUS is coupled to capacitor CY via switch Z3. The control input of voltage-controlled current source CUS is coupled to terminal 2 of capacitor CS through buffer 228. Buffer 228 may be a high impedance buffer and may be implemented using, for example, an operational amplifier.

In some embodiments, system 200 may detect objects that may touch or be in proximity to system 200 using multiple charging cycles. During each charging cycle, charge is injected to capacitances in system 200, including sampling capacitor CS and capacitors CX and CY. After each charging cycle, capacitances in system 200 except sampling capacitor CS are discharged. In this manner, after each charging cycle, the voltage on sampling capacitor CS increases. In some embodiments, the voltage across sampling capacitor CS is analyzed after a predetermined number of charging cycles to determine whether a touch has occurred or to determine whether an object is in proximity to system 200. In other embodiments, the voltage across sampling capacitor CS is analyzed after each charging cycle to determine whether it is at or above a threshold. If so, further charging cycles are not performed. To determine whether a touch has occurred or whether an object is in proximity to system 200, the number of charging cycles performed so that the voltage across sampling capacitor CS is at or above the threshold is analyzed. Further details and examples of detecting touch or proximity in this manner is given in U.S. Pat. No. 6,466,036. As discussed further below, in some embodiments injecting charge into system 200 prior to charging sampling capacitor CS during a charging cycle may improve detection of touches or detection of whether an object is in proximity to system 200.

In some embodiments, voltage-controlled current source CUS may be used to charge, using current IL, one or more of the parasitic capacitances present in system 200 (represented using capacitors CLX0-CLX31, CLY0-CLY31, CPX0-CPX31, CPY0-CPY31, CX, and CY) prior to injecting charge into capacitor CS during a charging cycle in order to reduce one or more undesirable effects of parasitic capacitances in system 200.

For example, current peaks or spikes occurring during a charging cycle may be avoided or reduced because the sum of certain capacitances present in system 200 (represented in FIG. 2 as capacitors CX, CY, CLX0-CLX31, CLY0-CLY31, CPX0-CPX31, and CPY0-CPY31) may be relatively large depending on the size of touch sensor 210 and other parameters in system 200 (e.g., between 400-10,000 picofarads). Another example of a benefit of precharging certain capacitances in system 200 is that a lower amount of current may flow through system 200 at a given time during a charge cycle then if precharging did not occur. This may be because currents occurring in system 200 are spread over time due to the precharging. Yet another example of a benefit of precharging certain capacitances in system 200 is that sampling capacitor CS may have a reduced capacitance value. For example, if precharging is not used, sampling capacitor CS may need to have a capacitance of 50-100 microfarads; when precharging is used, sampling capacitor CS may have a value between 100-200 nanofarads.

While a particular number of components are depicted in FIG. 2, these are not intended to limit the scope of the present disclosure. Any suitable number of components may be used. For example, there may be more or less lines coupled to sets of electrodes of touch sensor 210 than depicted. As another example, there may be multiple capacitors CS in controller 220 that may each be coupled to the same or different electrode sets of touch sensor 210. Other suitable variations may be implemented without departing from the scope of the present disclosure.

Figure 4:
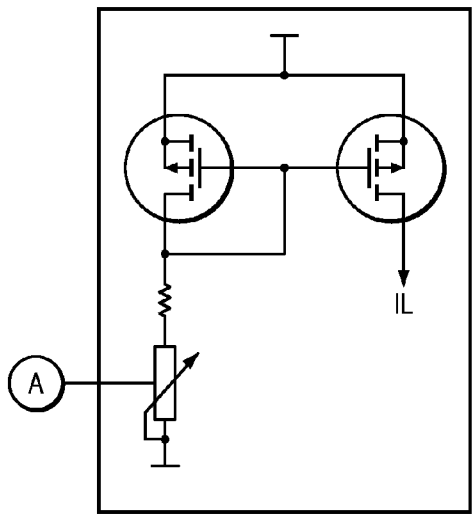
FIG. 4 illustrates one embodiment of a current source used in the system of FIG. 2.

In some embodiments, current source CUS may be implemented such that: it has a high impedance input; the input voltage can vary from zero to the amount of voltage provided by voltage source Vdd; output current IL varies linearly with the input voltage; output current IL is constant if the input voltage is fixed through a wide range of load impedances; and such that current source CUS can respond to voltage input changes within 1-2 microseconds. An example of such a voltage-controlled power source is depicted in FIG. 4 which depicts a current mirror that uses MOSFET transistors. As another example, current source CUS may be implemented using a Howland current source. As described further below, the charging of certain capacitances in system 200 using current source CUS may be controlled by switches in system 200, such as switches Z1 and Z3.

In some embodiments, structures other than current source CUS may be used to provide current IL. For example, current IL may be provided using a capacitor. One terminal of the capacitor is coupled to a voltage source via a switch. The other terminal of the capacitor is coupled to capacitors CX and CY via switches Z1 and Z3. As another example, current IL may be provided using a resistor. One terminal of the resistor is coupled to a voltage source and the other terminal of the resistor is coupled to capacitors CX and CY via switches Z1 and Z3.

In some embodiments, touch sensor 210 is implemented using one or more embodiments discussed above with respect to touch sensor 10 of FIG. 1 and controller 220 is implemented using one or more embodiments discussed above with respect to controller 12 of FIG. 1. In operation, in some embodiments, system 200 may detect touches on, or proximity of an object to, touch sensor 210. Touch sensor 210 comprises electrodes aligned in multiple axes. Electrodes aligned in a first axis (e.g., the x-axis) are coupled to lines X0-X31 and electrodes aligned in a second axis (e.g., the y-axis) are coupled to lines Y0-Y31.

As an example, the set of electrodes coupled to each line of lines X0-X31 may be driven with a drive signal and signals present on the set of electrodes coupled to each line of lines Y0-Y31 may be measured as discussed above with respect to touch sensor 10 and controller 12 of FIG. 1. Capacitor CS may be used when measuring signals from electrodes coupled to lines Y0-Y31. For example, the voltage at terminal 1 of capacitor CS is measured (while terminal 2 is coupled to ground) to determine if a touch (or proximity of an object) has been detected with respect to a pair of electrode sets, one electrode set of the pair coupled to one of lines X0-X31 and the other electrode set of the pair coupled to one of lines Y0-Y31. Embodiments of implementing a detection for one pair of electrode sets are discussed below with respect to FIG. 3. The voltage at terminal 1 of capacitor CS may be measured with respect to each pairing of electrode sets (wherein each pairing includes a set of electrodes coupled to one of lines X0-X31 and a set of electrodes coupled to one of lines Y0-Y31) to detect touches on, or proximity of an object to, touch sensor 210. In some embodiments, system 200 may be configured to detect proximity of an object by measuring some or all electrodes simultaneously. For example, during a charging cycle, switches Z0 and Z2 as well as the switches of switch bank 230 and 232 are all on. One or more of the embodiments discussed in FIG. 3 may be repeated for each such pairing of electrode sets when measuring the voltage at terminal 1 of the capacitor CS.

Figure 3:
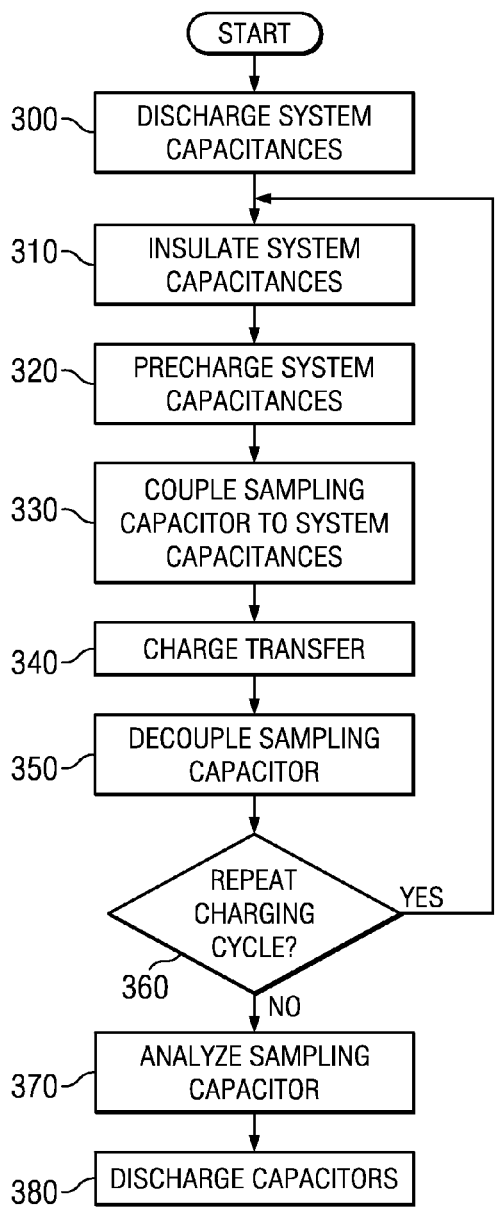
FIG. 3 illustrates an example method for detecting touches or detecting proximity of objects using the system of FIG. 2.

FIG. 3 illustrates an example method for detecting touches or detecting proximity of objects using system 200 of FIG. 2. The steps of FIG. 3 discussed below may be applied to any suitable grouping of electrodes of touch sensor 210. For example, the steps of FIG. 3 discussed below may be performed with respect to a pairing of electrode sets, one electrode set of the pair coupled to one of lines X0-X31 and the other electrode set of the pair coupled to one of lines Y0-Y31 of FIG. 2. The steps of FIG. 3 discussed below may be repeated as necessary to perform a scan of some or all of the electrodes of touch sensor 210. While the steps of FIG. 3 are discussed below using the components and configuration of FIG. 2 as an example, the steps of FIG. 3 may be performed in other suitable manners as discussed further below. Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

The method may start, in some embodiments, at step 300, where one or more of the capacitances in system 200 of FIG. 2 are discharged. Examples of capacitors (including those representing parasitic capacitances) that may be discharged at this step include capacitors CS, CX, CY, CPX0-CPX31, CPY0-CPY31, CLX0-CLX31 and CLY0-CLY31. As an example, this step is performed by toggling the following switches of system 200 as follows:

K1—off; K2—on; K3—on; K4—off; Z0—on; Z1—off; Z2—on; Z3—off.

At step 300, lines YC0-YC31 and XC0-XC31 may be coupled to ground. For example, each individual line of lines YC0-YC31 and XC0-XC31 may be coupled to a switch that can couple the individual line to ground. Lines YC0-YC31 and XC0-XC31 may all be coupled to ground at step 300 using such switches.

At step 310, in some embodiments, capacitances in system 200 (e.g., capacitors CX, CY, CPX0-CPX31 and CPY0-CPY31) are insulated from sampling capacitor CS. This may be performed in preparation for precharging capacitances in system 200. As an example, this step is performed by toggling the following switches of system 200 as follows:

K1—on; K2—off; K3—on; K4—on; Z0—off; Z1—off; Z2—off; Z3—off.

After this is done, in some embodiments, terminal 1 of sampling capacitor CS may be coupled to voltage source Vdd. This may allow for the voltage present on capacitor CS to be used to control current source CUS. Further, switches Z3 and Z1 may subsequently be closed. In this manner, precharging may be initiated by only having to open switch K4. As an example, prior to precharging, the state of switches of system 200 may be as follows:

K1—on; K2—off; K3—on; K4—on; Z0—off; Z1—on; Z2—off; Z3—on.

At step 320, in some embodiments, capacitances of system 200 are precharged. This is performed using current source CUS. Charge may be transferred, at this step, to capacitors CX, CY, CPX0-CPX31, CPY0-CPY31, CLX0-CLX31, CLY0-CLY31. This may occur for a predetermined amount of time. The amount of charge transferred at this step may be dependent on the voltage between terminals 1 and 2 of capacitor CS. As this voltage increases, the amount of current from current source CUS will decrease linearly. Controlling the amount of precharging using the voltage across capacitor CS may prevent premature saturation of capacitances of system 200. Premature saturation of these capacitances may affect the ability for system 200 to detect whether a touch has occurred or to detect whether an object is in proximity to system 200.

As an example, precharging may be performed by toggling the following switches of system 200 as follows:

K1—on; K2—off; K3—off; K4—off; Z0—off; Z1—on; Z2—off; Z3—on.

After the predetermined time, the precharging may be stopped. As an example, this is performed by toggling the following switches of system 200 as follows:

K1—on; K2—off; K3—off; K4—off; Z0—off; Z1—off; Z2—off; Z3—off.

A benefit present in one or more embodiments of the precharging that occurs at step 320 is that it reduces the effect of parasitic capacitances in system 200 when detecting whether an object is in proximity to touch sensor 210 or is in contact with touch sensor 210. System 200 may be configured to detect such events by analyzing the manner in which sampling capacitor CS is charged. Parasitic capacitances in system 200 may affect the charging of sampling capacitor CS by altering the capacitive characteristics of system 200. In some embodiments, precharging the capacitances represented by capacitors CPX0-CPX31, CPY0-CPY31, CLX0-CLX31, and CLY0-CLY31 reduces the effects of parasitic capacitances in system 200 thereby facilitating touch detection or detection of objects in proximity to system 200.

At step 330, in some embodiments, sampling capacitor CS is coupled to other capacitances present in system 200. For example, terminal 2 of capacitor CS may be coupled to capacitors CX and CY while terminal 1 of capacitor CS may be floating. This may be performed in preparation for driving and sensing electrodes of touch sensor 210 when, for example, detecting whether a touch has occurred. As an example, this is performed by toggling the following switches of system 200 as follows:

K1—off; K2—off; K3—off; K4—off; Z0—on; Z1—off; Z2—on; Z3—off.

At step 340, in some embodiments, charge distribution in system 200 may occur. The distribution may be initiated by coupling terminal 1 of sampling capacitor CS to voltage source Vdd.

As an example, this is performed by toggling the following switches of system 200 as follows:

K1—on; K2—off; K3—off; K4—off; Z0—on; Z1—off; Z2—on; Z3—off.

Charge from voltage source Vdd may be transferred to sampling capacitor CS as well as capacitors CX, CY, CPX0-CPX31, CPY0-CPY31, CLX0-CLX31, and CLY0-CLY31. Due to the precharging at step 330, in some embodiments, less charge may be transferred to capacitors CX, CY, CPX0-CPX31, CPY0-CPY31, CLX0-CLX31, and CLY0-CLY31 at step 340 than would have occurred had the precharging at step 330 not been performed.

At step 350, in some embodiments, sampling capacitor CS is decoupled from capacitors CX and CY. As an example, this is performed by toggling the following switches of system 200 as follows:

K1—off; K2—off; K3—off; K4—off; Z0—on; Z1—off; Z2—on; Z3—off.

At step 360, in some embodiments, a determination is made as to whether further charging cycles are to be performed. If so, capacitances of system 200 other than sampling capacitor CS may be discharged and the method may return to step 310; if not, then step 370 may be performed. This step may be performed in multiple manners. For example, the determination at this step may be performed by comparing the number of charging cycles that have been performed to a threshold. If the number of charging cycles performed is greater than or equal to the threshold, then it may be determined that further charging cycles are not to be performed. If the number of charging cycles to be performed is less than the threshold, then it may be determined that further charging cycles are to be performed.

As another example, the voltage across sampling capacitor CS may be compared to a threshold. If it is less than the threshold, then the method may return to step 310. If it is greater than or equal to the threshold, then it may be determined that a further charging cycle is not to be performed.

In some embodiments, a counter is incremented if it is determined that a further charge cycle shall be performed. The counter may indicate the number of charge cycles that have been performed. If it is determined that a further charge cycle shall be performed at this step, then one or more capacitances of system 200 other than sampling capacitor CS may be discharged before step 310 is performed (e.g., capacitors CX and CY) may be discharged. As an example, this is performed by toggling the following switches of system 200 as follows:

K1—off; K2—off; K3—on; K4—off; Z0—on; Z1—off; Z2—on; Z3—off.

At step 370, in some embodiments, sampling capacitor CS is analyzed. For example, if the determination at step 360 is made based on the number of charging cycles performed, then the voltage across sampling capacitor CS is analyzed to determine whether a touch by an object has occurred on, or whether an object has become proximate to, touch sensor 210. If a touch has not occurred or if an object is not in proximity to system 200, then less charge is transferred to capacitor CS during a charging cycle than if a touch had occurred or if an object was in proximity to system 200. As a result, if the voltage across sampling capacitor CS is greater than a predetermined amount, then it may be determined that a touch occurred or that the proximity of an object was detected. If it is equal to or less than a predetermined amount, then it may be determined that an object is not in contact with touch sensor 210 or it may be determined that an object is not in proximity to touch sensor 210.

In some embodiments, whether an object has come into contact with touch sensor 210 as opposed to being in proximity to touch sensor 210 may be determined using the voltage across sampling capacitor CS at step 370. For example, if the voltage is greater than or equal to a first predetermined amount but less than a second predetermined amount, then it may be determined that an object is in proximity to touch sensor 210 but not in contact with touch sensor 210. As another example, if the voltage across sampling capacitor CS is greater than the first predetermined amount and the second predetermined amount, then it may be determined that the object is in contact with touch sensor 210.

As another example, the determination at step 360 to perform step 370 may be based on the voltage across sampling capacitor CS. The number of charging cycles performed in order for sampling capacitor CS to have that voltage may be analyzed at step 370. The analysis may be used to determine whether a touch by an object has occurred on, or whether an object has become proximate to, touch sensor 210. This may be done by analyzing the value of one or more counters. For example, a greater amount of charge may be transferred to capacitor CS if an object is in contact with, or proximate to, touch sensor 210 than if an object is not in contact with, or proximate to, touch sensor 210. Hence, if an object is in contact with, or proximate to, touch sensor 210, less charging cycles are required for the voltage on capacitor CS to be greater than or equal to the threshold used at step 360 than if an object is not in contact with, or not proximate to, touch sensor 210. At step 370, if the number of cycles is greater than a predetermined amount, then a touch or the proximity of an object may be considered as detected. If it is equal to or less than a predetermined amount, then it may be determined that an object is not in contact with touch sensor 210 or it may be determined that an object is not in proximity to touch sensor 210.

In some embodiments, whether an object has come into contact with touch sensor 210 as opposed to being in proximity to touch sensor 210 may be determined using the number of cycles needed for the voltage at capacitor CS to be greater than the threshold at step 360. For example, if the number of cycles is greater than or equal to a first predetermined amount but less than a second predetermined amount, then it may be determined that an object is in proximity to touch sensor 210 but not in contact with touch sensor 210. As another example, if the number of cycles is greater than the first predetermined amount and the second predetermined amount, then it may be determined that the object is in contact with touch sensor 210.

At step 380, in some embodiments, capacitors of system 200 (including those representing parasitic capacitances) may be discharged. This may be performed because threshold at step 370 has been met or surpassed, indicating that the particular pair of electrode sets has been sufficiently sampled. Capacitor CS may be discharged at this step. Parasitic capacitances may also be discharged, by, for example, coupling capacitors CX, CY, CPX0-CPX31, CPY0-CPY31, CLX0-CLX31, CLY0-CLY31 to ground. As an example, this is performed by toggling the following switches of system 200 as follows:

K1—off; K2—on; K3—on; K4—on; Z0—on; Z1—off; Z2—on; Z3—off.

In some embodiments, the steps discussed above with respect to FIG. 3 may be applied to all of touch sensor 210 by applying the steps to pairs of electrode sets included in touch sensor 210. For example, the steps of FIG. 3 may first be applied to the set of electrodes coupled to conductor X0 and conductor Y0. Then, the steps of FIG. 3 may be applied to the set of electrodes coupled to conductor X0 and conductor Y1. In some embodiments, the steps of FIG. 3 may be applied to multiple pairings of electrode sets simultaneously. For example, there may be more than one capacitor CS. Each capacitor CS may be coupled to different electrode sets of touch sensor 210. For example, one capacitor CS may be coupled to electrode sets coupled to lines Y0, Y2, and Y4 while a different capacitor CS may be coupled to electrode sets coupled to lines Y1, Y3, and Y5. In this situation, the steps of FIG. 3 may be applied to the electrode sets coupled to lines X0 and Y0 at the same time as they are applied to the electrode sets coupled to lines X0 and Y1. Other suitable variations, pairings, and components may be used to facilitate driving and sensing electrodes of touch sensor 210.

Depending on the specific features implemented, particular embodiments may exhibit some, none, or all of the following technical advantages. Detection of touches may be performed more accurately. The effect of parasitic capacitances may be reduced. The sensitivity of capacitive detection may be increased such that the proximity of an object to a touch sensor may be detected. For example, using the embodiments discussed above, variances of capacitance approximately 50 microfarads in size that may be introduced by an object in proximity to a touch sensor may be detected. Other technical advantages will be readily apparent to one skilled in the art from the preceding figures and description as well as the proceeding claims. Particular embodiments may provide or include all the advantages disclosed, particular embodiments may provide or include only some of the advantages disclosed, and particular embodiments may provide none of the advantages disclosed.

Herein, reference to a computer-readable non-transitory storage medium may include a semiconductor-based or other integrated circuit (IC), such as for example a field-programmable gate array (FPGA) or an application-specific IC (ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, performed by executing logic embodied by one or more computer-readable non-transitory storage media, comprising:
   discharging a first capacitor;
   discharging a first set of lines of a touch sensor, each line of the first set of lines comprising electrodes, the first set of lines arranged along a first axis;
   discharging a second set of lines of the touch sensor, each line of the second set of lines comprising electrodes, the second set of lines arranged along a second axis that is different than the first axis;
   after discharging the first capacitor, the first set of lines, and the second set of lines, causing charge to be transferred to a first line of the first set of lines;
   repeatedly performing a charging cycle after causing charge to be transferred to the first line of the first set of lines, the charging cycle comprising:
      coupling the first capacitor to a voltage source and to the first line of the first set of lines during a first time period; and
      decoupling the first capacitor from the voltage source and the first line of the first set of lines;
   after performing the charging cycle at least more than once, comparing the voltage across the first capacitor to a first threshold;
   in response to comparing the voltage across the first capacitor to the first threshold, determining the number of charging cycles that were performed; and
   determining whether a touch was detected by the touch sensor using the comparison of the voltage across the first capacitor to the first threshold and the number of charging cycles that were performed.

2. The method of claim 1, wherein causing charge to be transferred to the first line of the first set of lines comprises:
   coupling the first line of the first set of lines to a current source;
   causing charge to be transferred from the current source to the first line of the first set of lines, wherein the amount of charge transferred from the current source to the first line of the first set of lines is controlled using the voltage across the first capacitor.

3. The method of claim 1, further comprising:
   determining that the number of charging cycles that were performed is less than a second threshold;
   in response to determining that the number of charging cycles that were performed is less than a second threshold, performing the charging cycle.

4. The method of claim 1, further comprising:
   comparing the voltage across the first capacitor to a second threshold; and
   determining whether an object is in proximity to the touch sensor using the comparison of the voltage across the first capacitor to the second threshold.

5. The method of claim 1, wherein causing charge to be transferred to the first line of the first set of lines comprises causing charge to be transferred to the first line of the first set of lines using a current source.

6. The method of claim 1, further comprising:
   after determining whether a touch was detected by the touch sensor, discharging the first capacitor, the first set of lines of the touch sensor, and the second set of lines of the touch sensor;
   causing charge to be transferred to a second line of the first set of lines;
   repeatedly performing a second charging cycle after causing charge to be transferred to the second line of the first set of lines, the second charging cycle comprising:
      coupling the first capacitor to the voltage source and to the second line of the first set of lines during a first time period; and
      decoupling the first capacitor from the voltage source and the second line of the first set of lines;
   after performing the second charging cycle at least more than once, comparing the voltage across the first capacitor to the first threshold;
   in response to comparing the voltage across the first capacitor to the first threshold, determining the number of second charging cycles that were performed; and
   determining whether a touch was detected by the touch sensor using the comparison of the voltage across the first capacitor to the first threshold and the number of second charging cycles that were performed.

7. The method of claim 1, wherein the charging cycle further comprises:
   after decoupling the first line of the first set of lines from the first capacitor, causing charge to be transferred to the first line of the first set of lines.

8. One or more computer-readable non-transitory storage media comprising logic that, when executed is operable to:

cause discharging of a first capacitor;
cause discharging of a first set of lines of a touch sensor, each line of the first set of lines comprising electrodes, the first set of lines arranged along a first axis;
cause discharging of a second set of lines of a touch sensor, each line of the second set of lines comprising electrodes, the second set of lines arranged along a second axis that is different than the first axis;
after causing the discharging of the first capacitor, the first set of lines, and the second set of lines, cause charge to be transferred to a first line of the first set of lines;
cause repeated performance of a charging cycle after causing charge to be transferred to the first line of the first set of lines, the charging cycle comprising:
 coupling the first capacitor to a voltage source and to the first line of the first set of lines during a first time period; and
 decoupling the first capacitor from the voltage source and the first line of the first set of lines;
after the charging cycle has been performed at least more than once, compare the voltage across the first capacitor to a first threshold;
in response to comparing the voltage across the first capacitor to the first threshold, determine the number of charging cycles that were performed; and
determine whether a touch was detected by the touch sensor using the comparison of the voltage across the first capacitor to the first threshold and the number of charging cycles that were performed.

9. The media of claim 8, wherein the logic is operable to cause charge to be transferred to the first line of the first set of lines by:
coupling the first line of the first set of lines to a current source;
causing charge to be transferred from the current source to the first line of the first set of lines, wherein the amount of charge transferred from the current source to the first line of the first set lines is controlled using the voltage across the first capacitor.

10. The media of claim 8, wherein the logic is further operable to:
determine that the number of charging cycles that were performed is less than a second threshold;
in response to determining that the number of charging cycles that were performed is less than the second threshold, perform the charging cycle.

11. The media of claim 8, wherein the logic is further operable to:
compare the voltage across the first capacitor to a second threshold; and
determine whether an object is in proximity to the touch sensor using the comparison of the voltage across the first capacitor to the second threshold.

12. The media of claim 8, wherein the logic is operable to cause charge to be transferred to the first line of the first set of lines and the second set of lines during the first time period by causing charge to be transferred to the first set of lines using a current source.

13. The media of claim 8, wherein the logic is further operable to:
after determining whether a touch was detected by the touch sensor, cause discharging of the first capacitor, the first set of lines of the touch sensor, and the second set of lines of the touch sensor;
cause charge to be transferred to a second line of the first set of lines after the first capacitor, the first set of lines of the touch sensor, and the second set of lines of the touch sensor are discharged;
cause repeated performance of a second charging cycle after causing charge to be transferred to the second line of the first set of lines, the second charging cycle comprising:
 coupling the first capacitor to a voltage source and to the second line of the first set of lines during a first time period; and
 decoupling the first capacitor from the voltage source and the second line of the first set of lines;
after the second charging cycle has been performed at least more than once, compare the voltage across the first capacitor to the first threshold;
in response to comparing the voltage across the first capacitor to the first threshold, determine the number of second charging cycles that were performed; and
determine whether a touch was detected by the touch sensor using the comparison of the voltage across the first capacitor to the first threshold and the number of charging cycles that were performed.

14. The media of claim 8, wherein the charging cycle further comprises:
after decoupling the first line of the first set of lines from the first capacitor, causing charge to be transferred to the first line of the first set of lines.

15. A system comprising:
a touch sensor comprising:
 a first set of lines, each line of the first set of lines comprising electrodes, the first set of lines arranged along a first axis; and
 a second set of lines, each line of the second set of lines comprising electrodes, the second set of lines arranged along a second axis that is different than the first axis;
a first capacitor; and
one or more processors configured to:
 cause discharging of the first capacitor;
 cause discharging of the first set of lines and the second set of lines;
 after discharging the first capacitor, the first set of lines, and the second set of lines, cause charge to be transferred to a first line of the first set of lines;
 cause repeated performance of a charging cycle after causing charge to be transferred to the first line of the first set of lines, the charging cycle comprising:
  couple the first capacitor to a voltage source and to the first line of the first set of lines during a first time period; and
  decouple the first capacitor from the voltage source and the first line of the first set of lines;
 after the charging cycle has been performed at least more than once, compare the voltage across the first capacitor to a first threshold;
 in response to comparing the voltage across the first capacitor to the first threshold, determine the number of charging cycles that were performed; and
 determine whether a touch was detected using the comparison of the voltage across the first capacitor to the first threshold and the number of charging cycles that were performed.

16. The system of claim 15, wherein the one or more processors are configured to cause charge to be transferred to the first line of the first set of lines by:

coupling the first line of the first set of lines to a current source;

causing charge to be transferred from the current source to the first line of the first set of lines, wherein the amount of charge transferred from the current source to the first line of the first set of lines is controlled using the voltage across the first capacitor.

17. The system of claim 15, wherein the one or more processors are further configured to:

determine that the number of charging cycles that were performed is less than a second threshold;

in response to determining that the number of charging cycles that were performed is less than the second threshold, cause the charging cycle to be performed.

18. The system of claim 15, wherein the one or more processors are further configured to:

compare the voltage across the first capacitor to a second threshold; and determine whether an object is in proximity to the touch sensor using the comparison of the voltage across the first capacitor to the second threshold.

19. The system of claim 15, wherein the one or more processors are configured to cause charge to be transferred to the first line of the first set of lines by causing charge to be transferred to the first set of lines using a current source.

20. The system of claim 15, the one or more processors are further configured to:

after determining whether a touch was detected by the touch sensor, cause discharging of the first capacitor, the first set of lines of the touch sensor, and the second set of lines of the touch sensor;

cause charge to be transferred to a second line of the first set of lines after the first capacitor, the first set of lines of the touch sensor, and the second set of lines of the touch sensor are discharged;

cause repeated performance of a second charging cycle after causing charge to be transferred to the second line of the first set of lines, the second charging cycle comprising:

coupling the first capacitor to a voltage source and to the second line of the first set of lines during a first time period; and decoupling the first capacitor from the voltage source and the second line of the first set of lines;

after the second charging cycle has been performed at least more than once, compare the voltage across the first capacitor to the first threshold;

determine whether a touch was detected by the touch sensor using the comparison of the voltage across the first capacitor to the first threshold and the number of charging cycles that were performed.

21. The system of claim 15, wherein the charging cycle further comprises:

after decoupling the first line of the first set of lines from the first capacitor, causing charge to be transferred to the first line of the first set of lines.

* * * * *